(12) United States Patent  (10) Patent No.: US 7,004,779 B2
Oreglio et al.  (45) Date of Patent: Feb. 28, 2006

(54) DEVICE FOR HOOKING/UNHOOKING LC CONNECTORS

(75) Inventors: Maurizio Oreglio, Bellinzago Lombardo (IT); Roberto Crippa, Costa Masnaga (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/720,194

(22) Filed: Nov. 25, 2003

(65)  Prior Publication Data

US 2004/0166716 A1  Aug. 26, 2004

(30) Foreign Application Priority Data

Feb. 21, 2003  (EP) .................................. 03290423

(51) Int. Cl.
 *H01R 13/627*  (2006.01)
(52) U.S. Cl. ..................................................... 439/352
(58) Field of Classification Search ................ 439/352, 439/350, 351, 353
See application file for complete search history.

(56)  References Cited

U.S. PATENT DOCUMENTS

| 5,159,652 A | | 10/1992 | D'Alphonse et al. |
| 5,330,366 A | * | 7/1994 | Tsuji et al. .................. 439/352 |
| 5,603,631 A | | 2/1997 | Kawahara et al. |
| 5,638,474 A | * | 6/1997 | Lampert et al. ............... 385/78 |
| 5,651,690 A | * | 7/1997 | Klas et al. .................... 439/352 |
| 6,174,190 B1 | * | 1/2001 | Tharp et al. ................. 439/352 |
| 6,259,856 B1 | * | 7/2001 | Shahid ........................ 385/147 |
| 6,746,158 B1 | * | 6/2004 | Merrick ........................ 385/53 |
| 6,776,645 B1 | * | 8/2004 | Roth et al. ................... 439/352 |

FOREIGN PATENT DOCUMENTS

EP  0 967 500 A2  12/1999

* cited by examiner

*Primary Examiner*—Phuong Dinh
(74) *Attorney, Agent, or Firm*—Sughrue Mion, PLLC

(57)  ABSTRACT

Device for hooking/unhooking connectors of the LC type, comprising a slide SL which, in order to unhook the LC connector, is pushed from the front side and presses a retaining latch of the LC connector.

11 Claims, 2 Drawing Sheets

DEVICE FOR HOOKING/UNHOOKING LC CONNECTORS

TECHNICAL FIELD

The present invention relates to a device for hooking/unhooking connectors of the LC (light crimp) type.

This application is based on, and claims the benefit of, European Patent Application No. 03290423.7 filed on Feb. 21, 2003 which is incorporated by reference herein.

BACKGROUND OF THE INVENTION

In a number of situations there is a need for interconnecting electronic modules efficiently. For example in the new Telecom equipment design, there is an eavy use of known SFF (Small Form Factor) and SFP (Small Form Plugable) optical modules which can be interconnected on the front panel by LC optical connectors of a known type.

Typically the front panel width of said optical modules is small (i.e. 20 mm/25 mm). Therefore it is very difficult to hook/unhook (connect/disconnect) LC optical connectors manually by fingers.

In particular, with reference to FIG. 2, the LC connector has on a side a retaining latch LC-RL engaging in a corresponding slot in the socket on the front panel of the optical module. To operate the LC connector manually a minimum width of the front panel should be required, which is greater than the available one. This is a drawback especially for removing/unhooking the LC connector, as it should be needed to press the retaining latch with the fingers.

This creates practical operating problems which render the LC optical connectors unusable with the available dimensions of the optical modules.

SUMMARY OF THE INVENTION

Therefore it is the main object of the present invention to provide a device for hooking/unhooking connectors of the LC type which solves the above mentioned problems.

This object is achieved by a device for hooking/unhooking at least one connector of the LC type, the connector to be inserted in a sockets placed in the front-panel of an electronic module and comprising a retaining latch for the engagement in the socket,
wherein said device comprises a slide with a "V" shaped protrusion placed in the front side of the module aside the socket, in such a position as by pushing the slide from the front side of the module, said "V" shaped protrusion pressing said retaining latch and the connector being unhooked.

The basic idea of the present invention is, in order to disconnect the LC connector, to provide a solution where pushing a slide from the front side, the connector retaining latch is pressed and the LC connector is unhooked.

These and further objects are achieved by means of an apparatus and method as described in the attached claims, which are considered an integral part of the present description.

BEST MODE OF CARRYING OUT THE INVENTION

The invention will become fully clear from the following detailed description, given by way of a mere exemplifying and non limiting example, to be read with reference to the attached drawing FIGS. 1A–1C wherein the device for hooking/unhooking connectors of the LC type is shown in front and side views.

As shown in FIGS. 1A–1C, on the front panel FP of the electronic module there are sockets SK especially designed to host the LC connectors LC.

The LC connector has on a side a "V" shaped retaining latch LC-RL which engages in a corresponding slot in the socket SK, when inserted in the socket (see the side views REST of FIG. 1A and PUSH in FIG. 1B).

According to the invention, an aperture guide (slot) AG is made close to the socket, as shown in FIG. 1C, where it is possible to thread a slide SL.

The front part of the slide SL comprises a "V" shaped protrusion VP provided towards the LC connector.

When the slide is in the rest position REST show in FIG. 1A, the LC connector is inserted in the socket so as the "V" shaped retaining latch LC-RL engages in the socket SK.

By pushing the slide by fingers from the front side of the module at the position labeled PUSH in FIG. 1C, when the slide SL is in the push position PUSH (shown in FIG. 1B) at the end of its stroke, the "V" shaped protrusion VP of the slide SL presses the retaining latch LC-RL, which is released from the socket, and the LC connector is unhooked.

In the rear part of the slide SL, a spring SP, connected to the slide and to the electronic module, pushes back the slide SL in the rest position REST when released by the fingers.

In the rear part of the slide SL, a spring (not shown in the FIGURE), connected to the slide and to the electronic module, pushes back the slide SL in the rest position REST when released by the fingers.

After the slide release, it is possible to remove the LC optical connector, catching its plastic strain relief.

Further implementation details will not be described, as the man skilled in the art is able to carry out the invention starting from the teaching of the above description.

Figure 1:
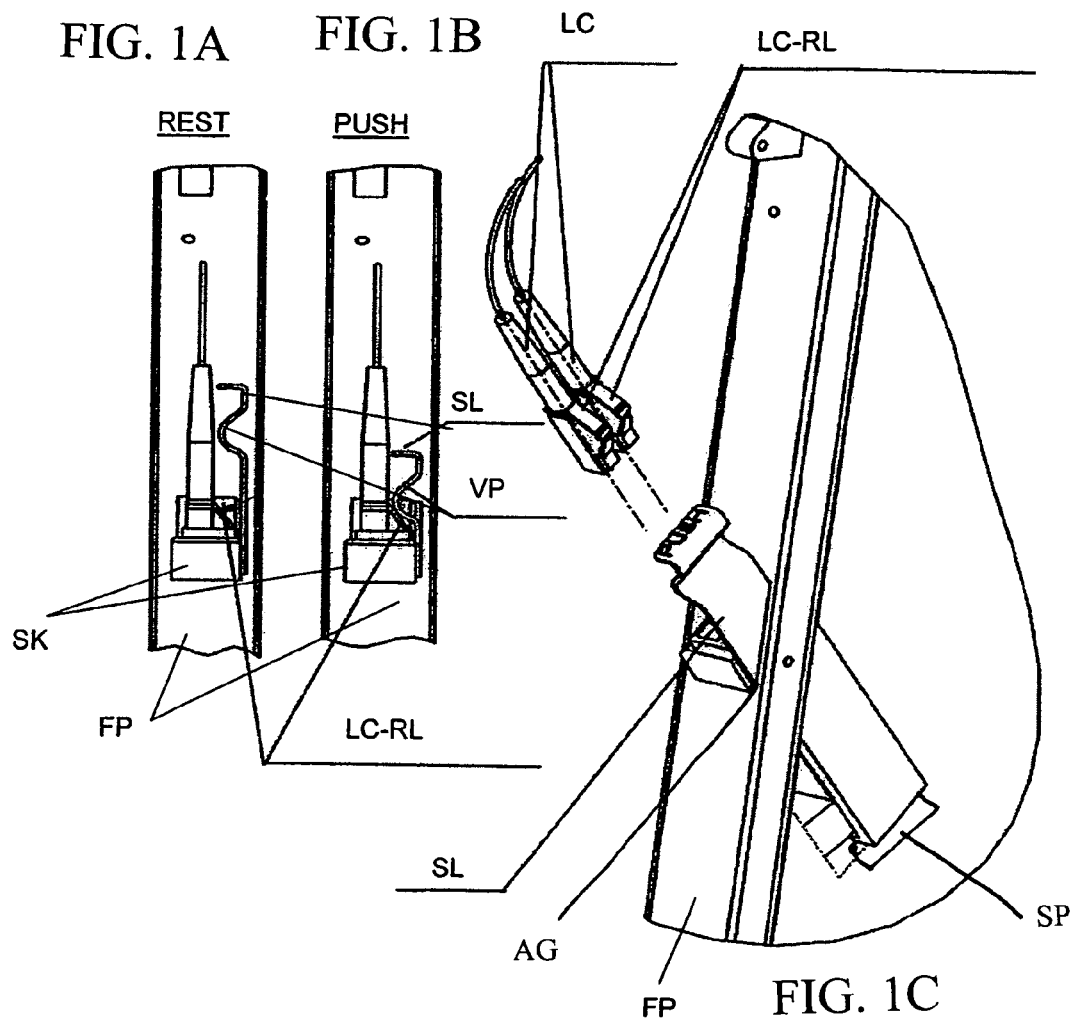
FIGS. 1A–1C show an exemplary embodiment of a device for hooking/unhooking an LC connector.
Figure 2:
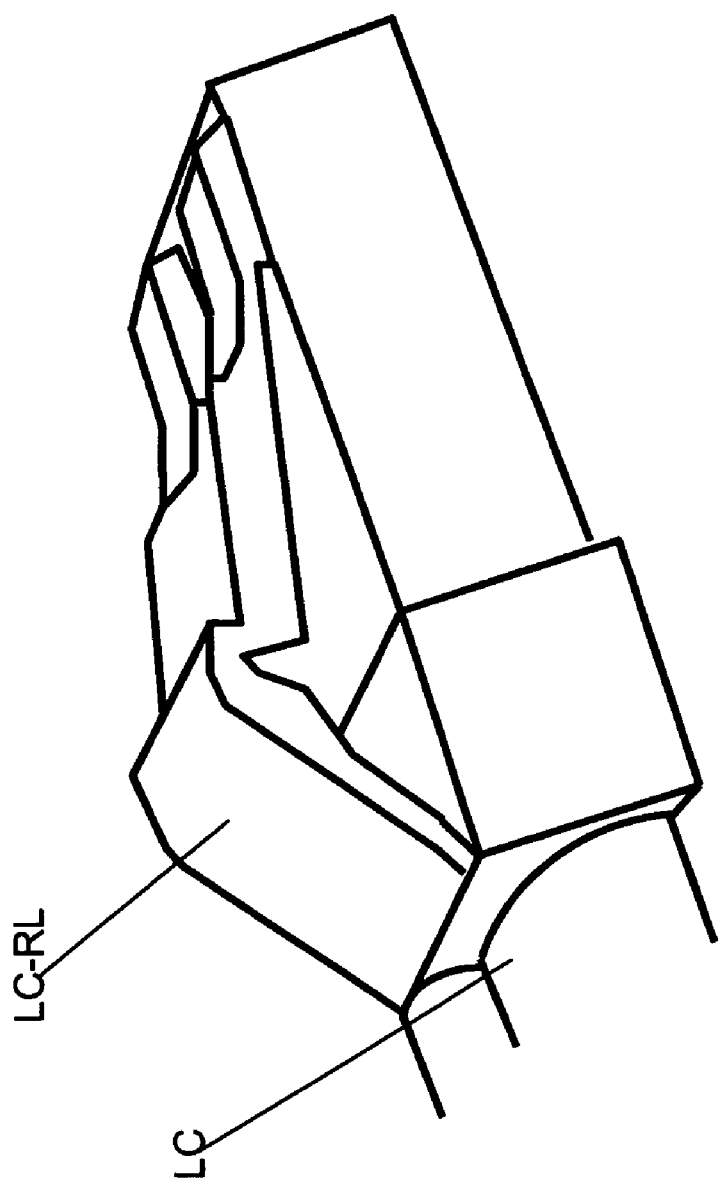
FIG. 2 shows LC connectors.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

What is claimed is:

1. Device for hooking/unhooking at least one connector of the LC type, the connector to be inserted in a socket placed in a front panel of an electronic module, and the connector comprising a retaining latch for engagement in the socket,
    wherein said device comprises a slide with a "V" shaped protrusion, said slide being placed in a front side of the module aside the socket, in such a position as by pushing the slide from the front side of the module, said "V" shaped protrusion pressing said retaining latch and the connector becoming unhooked; and
    wherein the device further comprises a spring in a rear part of the slide, connected to the slide and to the electronic module, said spring pushing back the slide in a rest position when released.

2. Device according to claim 1, wherein the slide is guided in an aperture guide on the front side of the electronic module, close to the socket.

3. Electronic module comprising a device according to claim 1.

4. A device for hooking/unhooking at least one LC type connector having a retaining latch, comprising:
- a socket placed in a front panel of an electronic module, said socket engaging with the connector by the retaining latch when the connector is inserted into the socket; and
- a slide with a protrusion placed in a front side of the module aside the socket, the slide being positioned such that by pushing the slide from the front side of the module, the protrusion presses the retaining latch, and the connector is unhooked from the socket; and
- wherein the device further comprises a spring provided in a rear part of the slide, said spring connected to the slide and to the electronic module, wherein said spring biases the slide to a rest position when the connector is released.

5. The device according to claim 4, further comprising an aperture guide on the front side of the electronic module close to the socket, wherein the slide is guided in the aperture guide.

6. The device according to claim 4, wherein the protrusion is a "V" shaped protrusion.

7. The device according to claim 6, further comprising an aperture guide on the front side of the electronic module close to the socket, wherein the slide is guided in the aperture guide.

8. A connector system, including:
- the device for hooking/unhooking the at least one LC type connector of claim 6; and
- the at least one LC type connector.

9. The system according to claim 8, further comprising an aperture guide on the front side of the electronic module close to the socket, wherein the slide is guided in the aperture guide.

10. The system according to claim 8, wherein the protrusion is a "V" shaped protrusion.

11. The system according to claim 10, further comprising an aperture guide on the front side of the electronic module close to the socket, wherein the slide is guided in the aperture guide.

* * * * *